US007451037B2

(12) United States Patent
Ikeda

(10) Patent No.: US 7,451,037 B2
(45) Date of Patent: Nov. 11, 2008

(54) LEARNING METHOD OF INJECTION CHARACTERISTIC AND FUEL INJECTION CONTROLLER

(75) Inventor: Sumitaka Ikeda, Anjo (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 11/819,033

(22) Filed: Jun. 25, 2007

(65) Prior Publication Data

US 2008/0004785 A1 Jan. 3, 2008

(30) Foreign Application Priority Data

Jul. 3, 2006 (JP) ............................ 2006-183218

(51) Int. Cl.
*B60T 7/12* (2006.01)
*F02M 1/00* (2006.01)

(52) U.S. Cl. ....................... 701/103; 701/115; 123/434; 123/674

(58) Field of Classification Search ................. 701/103, 701/104, 105, 109, 111, 115; 123/299, 300, 123/304, 305, 339.1, 339.12, 339.29, 339.19, 123/434, 436, 674, 675
See application file for complete search history.

(56) References Cited

U.S. PATENT DOCUMENTS

| | | | | |
|---|---|---|---|---|
| 5,749,334 | A * | 5/1998 | Oda et al. | 123/305 |
| 5,964,208 | A * | 10/1999 | Yamashita et al. | 123/674 |
| 6,755,176 | B2 | 6/2004 | Takeuchi et al. | |
| 6,968,268 | B2 * | 11/2005 | Yamada et al. | 701/111 |
| 6,990,958 | B2 * | 1/2006 | Asano et al. | 123/436 |
| 2004/0149263 | A1 * | 8/2004 | Tanei et al. | 123/406.29 |

FOREIGN PATENT DOCUMENTS

| | | |
|---|---|---|
| JP | 2003-343328 | 12/2003 |

* cited by examiner

*Primary Examiner*—John T Kwon
(74) *Attorney, Agent, or Firm*—Nixon & Vanderhye PC

(57) ABSTRACT

A learning time counter is started and updated if an operation state is stabilized after shifting to a certain operation range. Then, convergence of a FCCB correction value of a variation in an injection characteristic is determined. If the FCCB correction value is determined to have converged, a permit flag is turned on and the FCCB correction value is decided as a learning value. Even if the FCCB correction value does not converge, the learning value is compulsorily decided when the learning time counter reaches a threshold. If the FCCB correction value is decided early, a surplus time is added to a threshold of the next operation range. Thus, the variation of the injection characteristics among cylinders can be learned highly accurately while averting unnecessary lengthening of a learning time.

16 Claims, 12 Drawing Sheets

LEARNING METHOD OF INJECTION CHARACTERISTIC AND FUEL INJECTION CONTROLLER

CROSS REFERENCE TO RELATED APPLICATION

This application is based on and incorporates herein by reference Japanese Patent Application No. 2006-183218 filed on Jul. 3, 2006.

BACKGROUND OF THE INVENTION

1. Field of the Invention

The present invention relates to a learning method of an injection characteristic and to a fuel injection controller.

2. Description of Related Art

A known diesel engine performs a pilot injection of injecting fuel of a quantity less than a fuel quantity of a main injection before the main injection in order to inhibit a noise accompanying combustion or to improve an exhaust gas characteristic. Even if injection period command values, injection quantity command values (command injection quantities) and the like of the injectors are equalized in order to perform fuel injection control, a variation can be caused in the actually injected fuel quantities because of individual differences of the injectors. Specifically, the injection quantity of the pilot injection can become extremely small compared to the injection quantity of the main injection. Therefore, if a difference arises between the desired injection quantity and the actual injection quantity of the pilot injection, sufficient attainment of the above-mentioned objects will become difficult.

Therefore, a proposed controller, e.g., as described in JP-A-2003-254139, performs feedback control for conforming actual rotation speed of an engine to target rotation speed by performing N times of equally-divided fuel injections. The controller learns a learning value for compensating the difference between the command injection quantity and the desired injection quantity at that time. Furthermore, the controller performs the feedback control so that rotational fluctuation among the cylinders is compensated. The controller can grasp an injection characteristic at the time of performing a fuel injection of a minute quantity such as the pilot injection by performing the equally-divided N injections. As a result, an appropriate learning value can be obtained.

The time necessary for obtaining the learning value should be preferably as short as possible. However, when the processing for obtaining the learning value is performed for the first time, e.g., at the time of product shipment of the fuel injection controller, the time necessary for the feedback control to reach a stationary state tends to lengthen. If the learning is performed on the condition that a sufficient time for the first processing of obtaining the learning value elapses, obtainment of the learning value takes a long time. The inventor of the present invention found that accurate computation of a fluctuation correction value for compensating the rotation fluctuation among the cylinders becomes difficult if this time is shortened.

The difficulty in the learning of the variation in the injection characteristics among the cylinders with high accuracy while avoiding unnecessary lengthening of the time necessary for the learning is not limited to the learning of the pilot injection but is substantially common in fuel injection controllers compensating the variation in the injection characteristics among the cylinders.

SUMMARY OF THE INVENTION

It is an object of the present invention to enable learning of a variation in injection characteristics among cylinders with high accuracy while avoiding unnecessary lengthening of a time period necessary for the learning.

According to an aspect of the present invention, a learning step includes a convergence determination step of determining whether a fluctuation correction value has converged, a completion step of completing learning in a certain operation range by performing the learning when the convergence determination step determines that the fluctuation correction value has converged in the certain operation range, and a carry-over step of adding a lead time of the completion of the learning before a schedule time, which is decided by a threshold, to a threshold of an operation range, in which the learning is not yet performed, if the completion of the learning precedes the schedule time.

According to another aspect of the present invention, a learning device includes a convergence determination device that determines whether a fluctuation correction value has converged, a completion device that completes learning in a certain operation range by performing the learning when the convergence determination device determines that the fluctuation correction value has converged in the certain operation range, and a carry-over device that adds a lead time of the completion of the learning before a schedule time, which is decided by a threshold, to a threshold of an operation range, in which the learning is not yet performed, if the completion of the learning precedes the schedule time.

The time of period necessary for the convergence of the fluctuation correction value has a variation among injectors. If the threshold is defined based on the longest time assumed as the time necessary for the convergence, there is a possibility that the time necessary for the completion of the learning lengthens unnecessarily. The above-described method or structure sets the threshold of the period before the completion of the learning and decides the schedule time of the completion of the learning in accordance with the threshold. A lead time of the completion of the learning before the schedule time is added to a threshold of a range, in which the learning is not yet performed. Thus, by shifting to the next operation range when the learning is completed early, unnecessary delay of the completion of the learning can be averted. Moreover, by adding the lead time to the threshold of the range, in which the learning is not yet performed, the sufficient learning time in the range can be secured. As a result, the learning can be performed with high accuracy while averting the unnecessary lengthening of the learning time.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENTS

Figure 1:
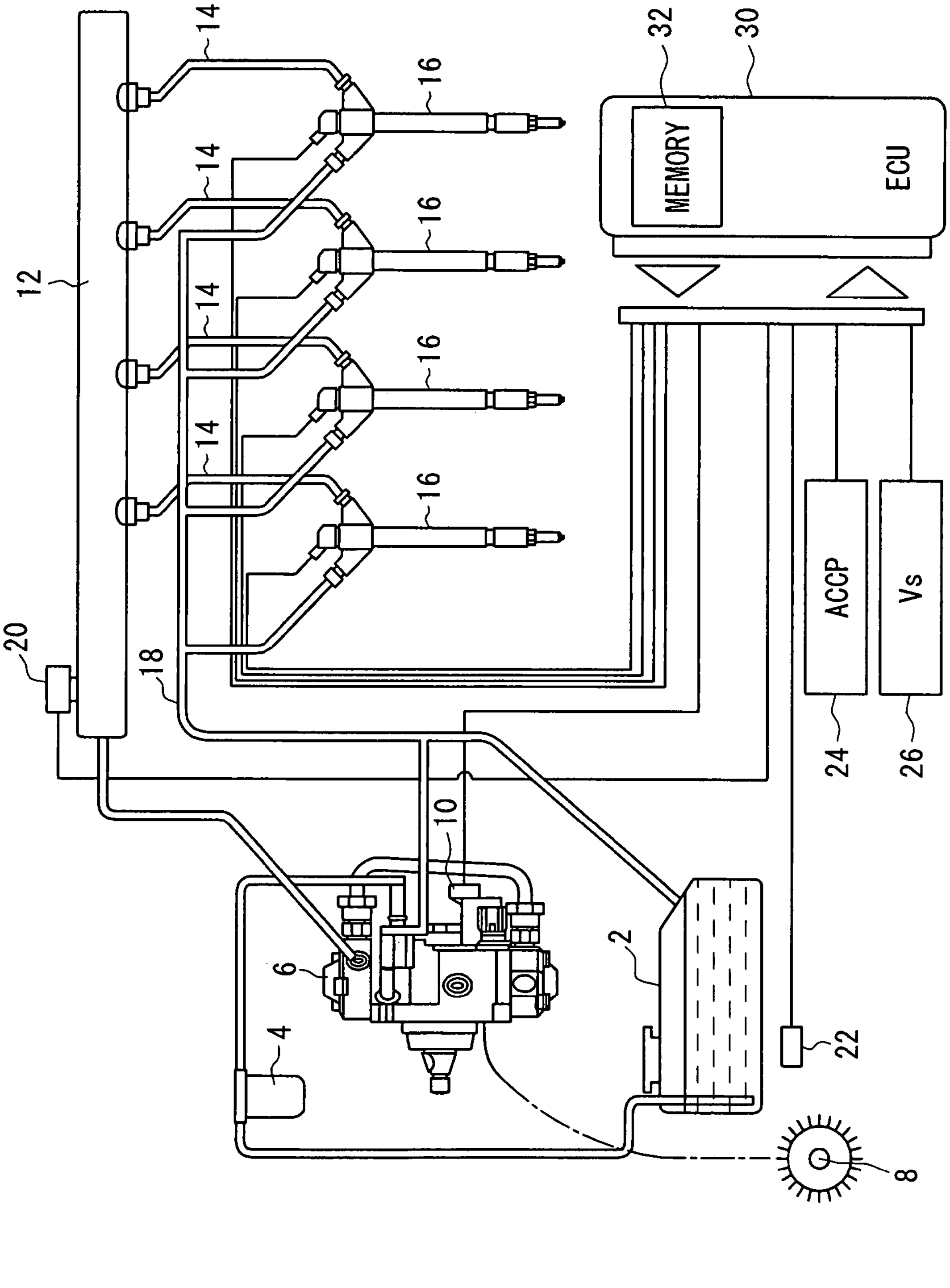
FIG. 1 is a schematic diagram showing an engine system according to a first embodiment of the present invention.

Referring to FIG. 1, an engine system according to a first embodiment of the present invention is illustrated. A fuel injection controller according to the present embodiment is applied to a fuel injection controller of a diesel engine. As shown in FIG. 1, a fuel pump 6 draws fuel from a fuel tank 2 through a fuel filter 4. The fuel pump 6 receives a force from a crankshaft 8, which is an output shaft of the diesel engine, and discharges the fuel. The fuel pump 6 has a metering valve 10. A quantity of the fuel discharged by the fuel pump 6 is determined by operation of the metering valve 10. The fuel pump 6 has multiple plungers. Each plunger reciprocates between a top dead center and a bottom dead center to perform suction and discharge of the fuel.

The fuel discharged from the fuel pump 6 is pumped to a common rail 12. The common rail 12 stores the fuel pumped from the fuel pump 6 at a high-pressure state. The stored high-pressure fuel is supplied to injectors 16 of cylinders (four cylinders are illustrated in this embodiment) through high-pressure fuel passages 14. The injectors 16 are connected with the fuel tank 2 through a low-pressure fuel passage 18.

The engine system has various sensors for sensing operation states of the diesel engine such as a fuel pressure sensor 20 for sensing fuel pressure in the common rail 12 and a crank angle sensor 22 for sensing a rotation angle of the crankshaft 8. The engine system has an accelerator sensor 24 for sensing an operation amount ACCP of an accelerator operated in accordance with acceleration requirement of a user. The engine system has a vehicle speed sensor 26 for sensing running speed Vs of a vehicle having the engine system.

An electronic control unit 30 (ECU) has a microcomputer as a main component. The ECU 30 has a constantly data holding memory 32. The constantly data holding memory 32 is a storage device that holds data irrespective of a state of a start switch (ignition switch). For example, the constantly data holding memory 32 is a nonvolatile memory such as an EEPROM that holds data irrespective of existence or nonexistence of energization or a backup memory that maintains an energized state irrespective of the state of the start switch. The ECU 30 takes in the sensing results of the above-mentioned various sensors and controls an output of the diesel engine based on the sensing results.

The ECU 30 performs fuel injection control in order to perform output control of the diesel engine appropriately. The fuel injection control according to the present embodiment is multi stage injection control of selecting injections from a pilot injection, a pre-injection, a main injection, an after injection, and a post-injection and of performing the selected injections during a combustion cycle. The pilot injection injects a minute quantity of the fuel to promote mixing of the fuel and air immediately before ignition. The pre-injection shortens a delay of the ignition timing after the main injection to inhibit generation of nitrogen oxides (NOx) and to reduce a combustion noise and vibration. The main injection injects the largest quantity of fuel in the multi stage injection to contribute to generation of output torque of the diesel engine. The after injection causes particulate matters (PM) to reburn. The post-injection controls temperature of exhaust gas to regenerate an after treatment device of the diesel engine such as a diesel particulate filter (DPF).

Figure 2:
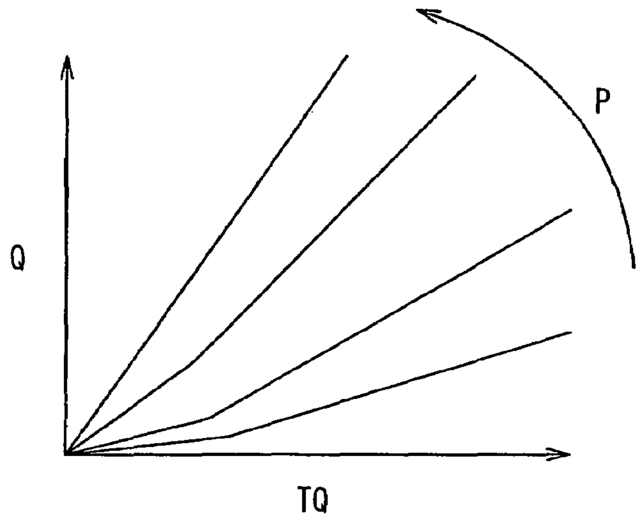
FIG. 2 is a diagram showing a map defining a relationship between an injection period and an injection quantity according to the first embodiment.

In the fuel injection control, the ECU 30 performs feedback control of conforming the fuel pressure in the common rail 12 to a target value (target fuel pressure) set in accordance with the operation state of the diesel engine. In order to perform the fuel injection of a command value of the injection quantity (command injection quantity) of the injector 16, the ECU 30 calculates a command value of the injection period (command injection period) of the injector 16 based on the fuel pressure sensed by the fuel pressure sensor 20 and the command injection quantity. The ECU 30 sets the command injection period using a map shown in FIG. 2 that defines a relationship among the injection quantity Q, the fuel pressure P and the injection period TQ. In the map of FIG. 2, when the fuel pressure P is the same, the injection period TQ is set longer as the injection quantity Q increases. When the injection quantity Q is the same, the injection period TQ is set shorter as the fuel pressure P increases.

The actual injector 16 has a variation in an injection characteristic because of an individual difference, a secular change and the like. Therefore, even if the fuel pressure and the injection period are fixed, the actual injection quantity injected from each injector 16 does not necessarily coincide with the desired injection quantity. The difference between the actual injection quantity and the desired injection quantity can pose a problem specifically in the fuel injection control of the minute injection such as the pilot injection in the multi stage injection used in the fuel injection control of the diesel engine.

For this reason, it is desirable to learn a deviation of the injection characteristic of the minute injection such as the pilot injection from a desired characteristic. Generally, it is very difficult to estimate the deviation of the injection characteristic of the minute injection based on sensing of the injection characteristic of the main injection if the injection characteristic of the injector 16 has a nonlinear relationship between the injection period and the injection quantity as shown in FIG. 2. An effect of the main injection appears specifically greatly in the rotation state of the diesel engine when the multi stage injection is performed. For this reason, it is difficult to learn the deviation of the injection characteristic of the minute injection based on the rotation state.

Therefore, in order to learn the deviation concerning the pilot injection, the system according to the present embodiment divides the demanded injection quantity into equal quantities and performs the fuel injection control. Each of the divided injection quantities is set at a minute fuel quantity corresponding to the pilot injection quantity to enable sensing of the injection characteristic of the injector 16 concerning the minute fuel quantity as the rotation state of the crankshaft 8. The system obtains an ISC correction value of the command injection quantity for conforming an average value of the rotation speed of the crankshaft 8 to target rotation speed during idle operation of the diesel engine. The system obtains a FCCB correction value of the command injection period for compensating the variation in rotation increase amounts of the crankshaft 8 among the cylinders accompanying the fuel injection. The system learns the deviation of the injection characteristic of the injector 16 of each cylinder based on the correction values. In order to learn the deviation with high accuracy, it is desirable to use the ISC correction value and the FCCB correction value as deviations that have converged as values for compensating the variation in the injection characteristics of the injectors 16.

Figure 3:
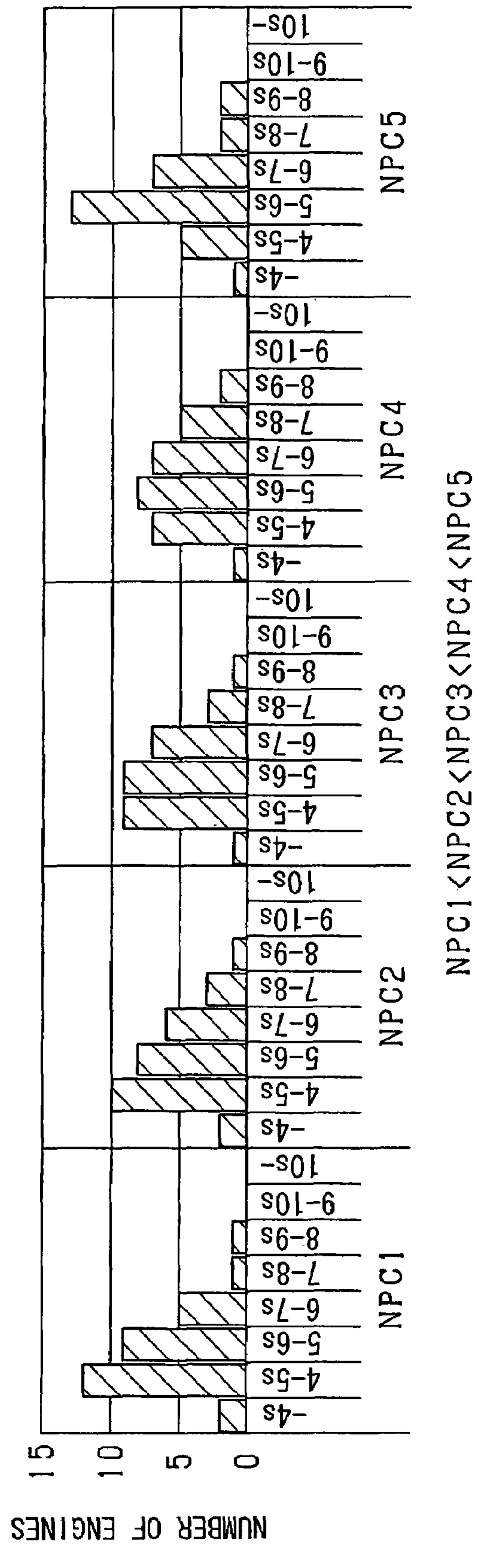
FIG. 3 is a diagram showing a variation in a time period necessary for learning.

Next, problems arising in the case where the learning is performed based on the convergence of the ISC correction value and the FCCB correction value will be explained. FIG. 3 shows a result of sampling convergence times (second) of the ISC correction value or the FCCB correction value in accordance with the fuel pressure NPC (NPC1<NPC2<NPC3<NPC4<NPC5) in the common rail 12 using multiple diesel engines having the injectors 16. The time necessary for the convergence varies among the individual engines as shown in FIG. 3. For this reason, when learning the ISC correction value or the FCCB correction value as the deviation of the injection characteristic after performing the above-mentioned feedback control for a predetermined period, the predetermined period has to be set longer than the longest time assumed as the time necessary for the convergence. In this case, a situation that the learning is not performed but waits although the ISC correction value or the FCCB correction value has actually converged can arise.

Figure 4:
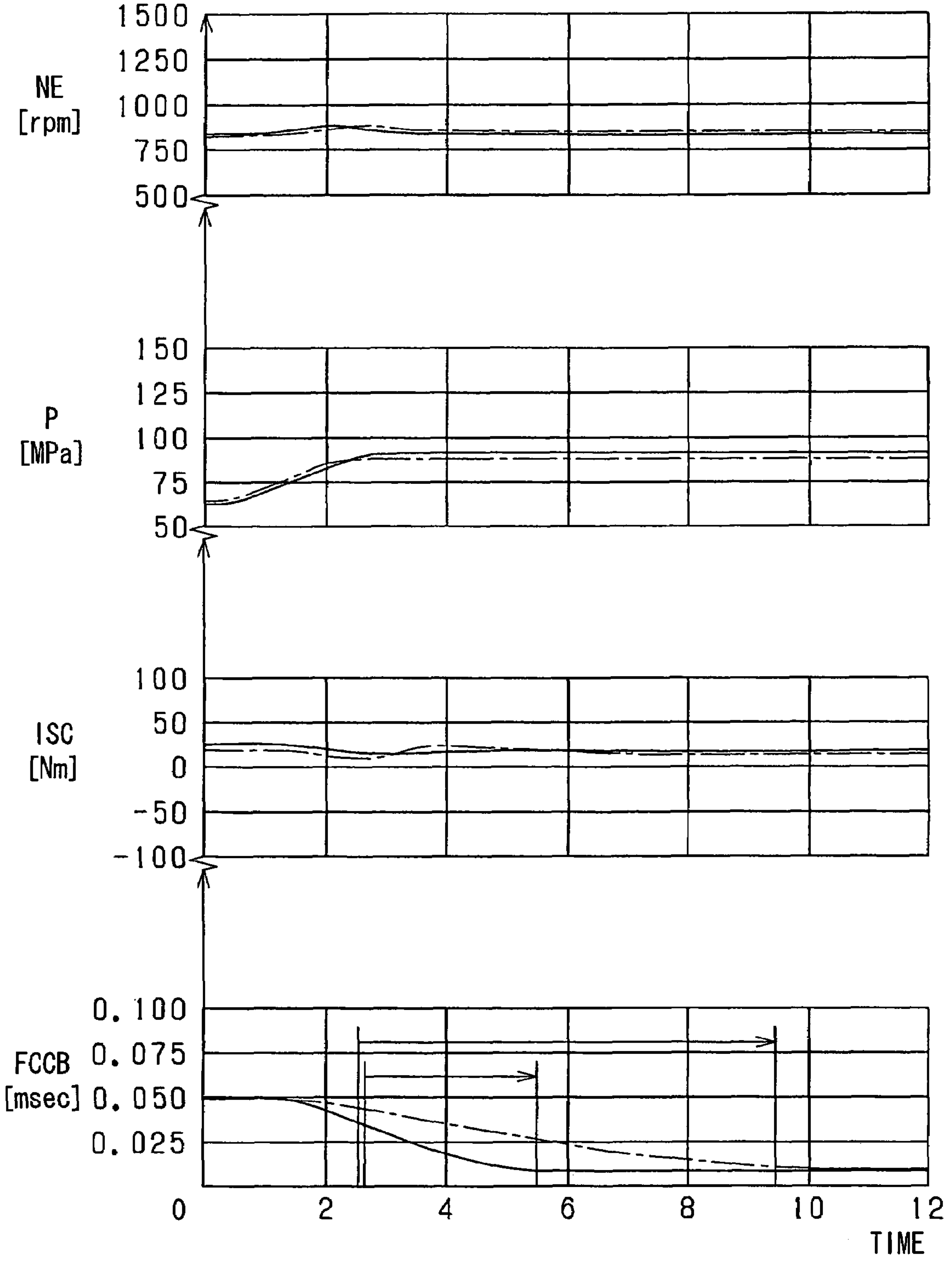
FIG. 4 is a time chart showing converging modes of various parameters during the learning.

As shown in FIG. 4, the variation in the convergence time is remarkable in the FCCB correction value. In FIG. 4, solid lines show the rotation speed NE, the fuel pressure P in the common rail 12, the ISC correction value (ISC) and the FCCB correction value (FCCB) of the diesel engine with the shortest convergence time out of the multiple diesel engines. Alternate long and short dash lines show the rotation speed NE, the fuel pressure P in the common rail 12, the ISC correction value (ISC) and the FCCB correction value (FCCB) of the diesel engine with the longest convergence time out of the multiple diesel engines. The variation in the convergence time is ignorable in the rotation speed NE, the fuel pressure P and the ISC correction value. However, a large difference is caused in the convergence time of the FCCB correction value.

Figure 5:
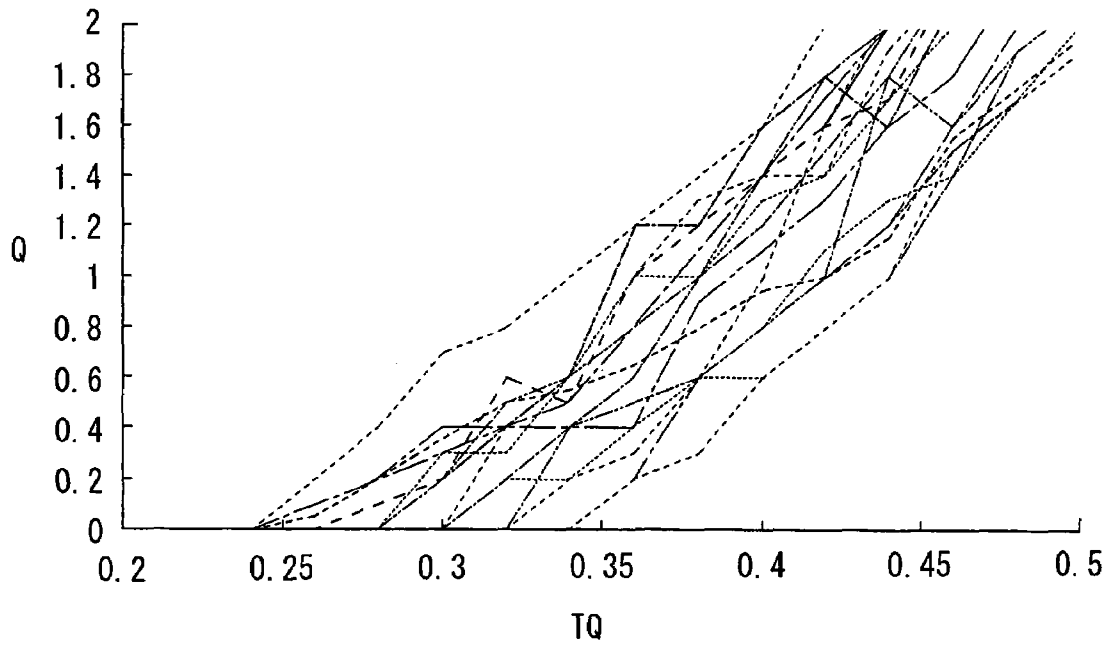
FIG. 5 is a diagram showing a variation in the relationship between the injection period and the injection quantity in a minute quantity injection range among injectors.

One of the reasons for the remarkable variation in the convergence time of the FCCB correction value is that the change of the injection quantity Q with respect to the change of the injection period TQ differs among the injectors 16 as shown in FIG. 5. FIG. 5 illustrates the injection characteristics of fourteen injectors 16 in the minute quantity injection range. Since the change of the injection quantity with respect to the change of the injection period differs among the individuals, the change of the injection quantity at the time when the FCCB correction value is changed differs among the cylinders. Therefore, it is comparatively difficult to inhibit the rotation fluctuation among the cylinders.

It is considered that increase of a gain of the feedback control using the FCCB correction value can be employed to promptly inhibit the rotation fluctuation among the cylinders. However, there is constraint on the increase of the gain of the feedback control using the FCCB correction value. That is, if the gain of the feedback control using the FCCB correction value is increased, the feedback control tends to interfere with the feedback control using the ISC correction value, causing a hunting. Since the rotation speed of the crankshaft 8 has to be maintained at target rotation speed when the idle rotation speed control is performed, the feedback control using the ISC correction value has to be performed preferentially. For this reason, it is necessary to increase the gain of the feedback control using the ISC correction value. The gain of the feedback control using the FCCB correction value has to be reduced compared with the gain of the feedback control using the ISC correction value.

Thus, specifically the variation in the convergence time of the FCCB correction value enlarges during the learning of the deviation of the injection characteristic, and the convergence time decides on the time necessary for the learning.

Therefore, in the present embodiment, it is determined whether the FCCB correction value has converged. The FCCB correction value and the ISC correction value at the time when it is determined that the FCCB correction value has converged are learned as the learning values of the deviation of the injection characteristic, and the learning is completed.

Figure 6:
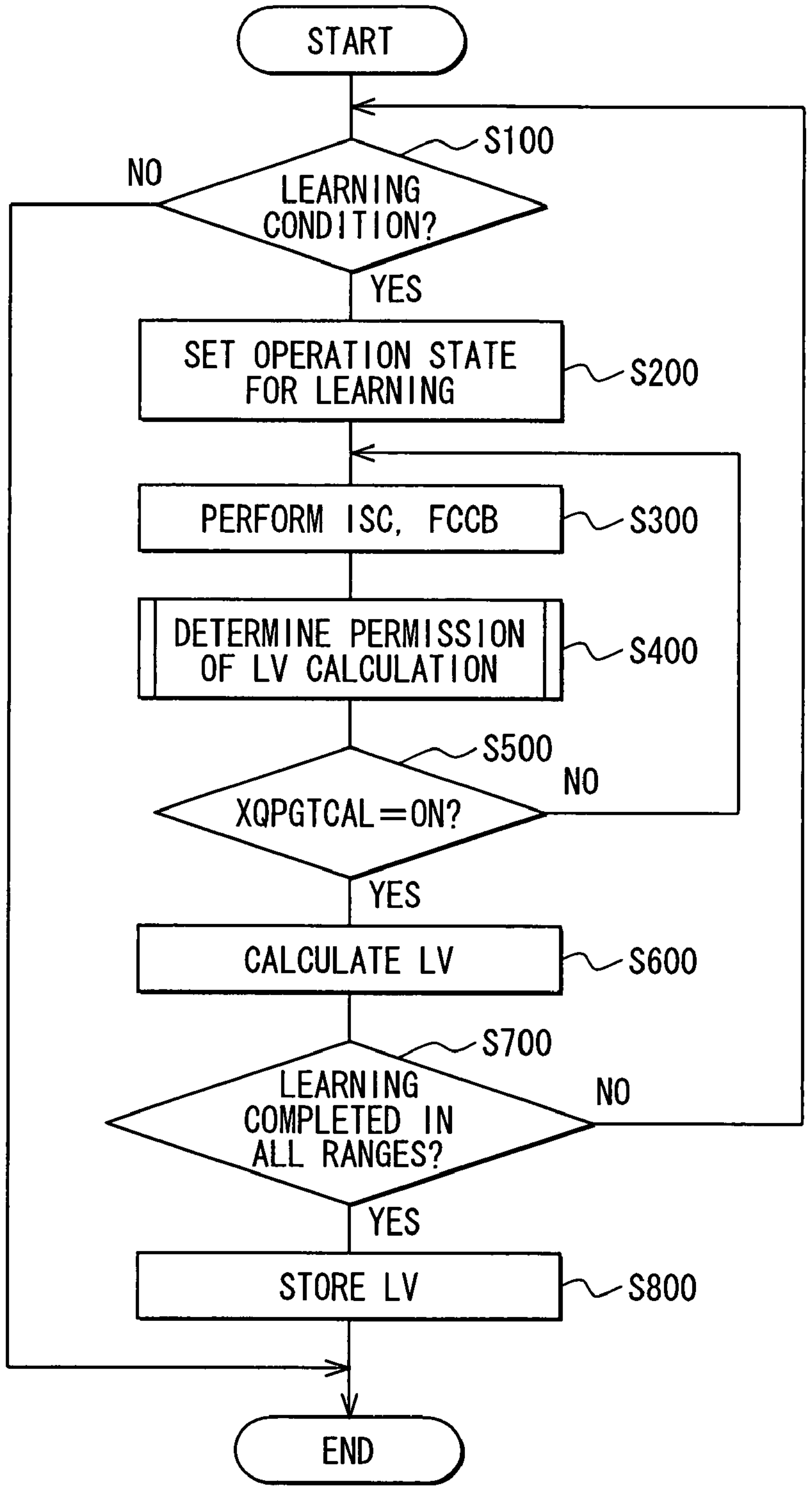
FIG. 6 is a flowchart showing a procedure of the learning according to the first embodiment.

FIG. 6 shows a procedure of the learning processing according to the present embodiment. The ECU 30 repeatedly performs this processing in a predetermined cycle. In a series of the processing, first, Step S100 determines whether learning conditions are satisfied. The learning conditions include a condition that the idle rotation speed control is performed, a condition that the pressed amount (operation amount ACCP) of the accelerator sensed by the accelerator sensor 24 is zero, a condition that the running speed Vs of the vehicle sensed by the vehicle speed sensor 26 is zero and the like. The learning conditions may also include a condition that a head lamp is unlit and a condition that an air-conditioner is in an off state, for example.

If it is determined that the learning conditions are satisfied at Step S100, the processing goes to Step S200. Step S200 sets an operation state for the learning of the deviation of the injection characteristic. First, a basic injection quantity is calculated. The basic injection quantity is an injection quantity assumed to be required to control the actual rotation speed of the crankshaft 8 to the target rotation speed during the idle operation. The basic injection quantity is set on the premises of a standard injection characteristic of the injector 16. If the basic injection quantity is calculated, the basic injection quantity is divided into equal N quantities and the fuel injection is performed. The integer N is set such that each of the injection quantities provided by dividing the basic injection quantity by N is equivalent to the pilot injection quantity. In order to perform the learning of the deviation of the injection characteristic in each of multiple operation ranges, the target fuel pressure in the common rail 12 is set at various values. The operation range is divided by the fuel pressure because the injection characteristic depends notably on the fuel pressure.

Following Step S300 performs feedback control with the ISC correction value and the FCCB correction value. In detail, the ISC correction value for performing the feedback control of conforming the average value of the actual rotation speed to the target rotation speed is calculated. The ISC correction value is added to the basic injection quantity, and the above-mentioned feedback control is performed. In more detail, each command injection quantity is calculated by dividing the sum of the ISC correction value and the basic injection quantity by N, and N times of injections are performed near a compression top dead center. The ISC correction value is a correction value for controlling the output torque of the crankshaft 8 generated by collaboration of the fuel injections of the injectors 16 of all the cylinders to the desired torque. Also, in order to equalize the rotation increase amounts of the crankshaft 8 accompanying the above-mentioned equally divided injections in the respective cylinders, the FCCB correction value of the command injection period is calculated for each cylinder. The command injection quantity, which is calculated by dividing the sum of the basic injection quantity and the ISC correction value by N, is converted into an injection period, and the thus-calculated injection period is corrected with the FCCB correction value. The fuel injection is performed using the injection period corrected with the FCCB correction value as the final command injection period.

Following Step S400 determines whether the calculation of the learning value LV of the deviation of the injection characteristic is permitted. If it is determined that the calculation is permitted, a permit flag XQPGTCAL is turned on. Following Step S500 determines whether the permit flag XQPGTCAL calculated at Step S400 is ON. If it is determined that the permit flag XQPGTCAL is not ON, the processing returns to Step S300. If it is determined that the permit flag XQPGTCAL is ON, the processing goes to Step S600.

The learning value LV is decided at Step S600. That is, a quantity of 1/N of the ISC correction value at this time is learned as the deviation of the injection characteristic uniform among all the cylinders out of the deviation of the actual injection characteristic from the desired injection characteristic. This learning value (ISC) is the correction value of the injection quantity uniform among all the cylinders. The FCCB correction values are learned as the deviations of the injection characteristics among the cylinders. These learning values (FCCB) are the correction values of the injection periods for correcting the variation in the injection characteristics among the cylinders. Following Step S700 determines whether the learning is completed in all the operation ranges. If it is determined that the learning is not completed in all the operation ranges, the processing goes to Step S100 to perform the processing of Steps S100 to S600, while shifting the operation range to another operation range by changing the target fuel pressure at Step S200.

If it is determined that the learning is completed in all the operation ranges at Step S700, the processing goes to Step S800. Step S800 stores all the learning values LV in the constantly data holding memory 32 for every operation range defined by the fuel pressure. Thereafter, the pilot injection can be performed while suitably compensating the deviation of the injection characteristic of the injector 16.

If Step S100 is NO or if the processing of Step S800 is completed, this series of the processing is once ended.

Figure 7:
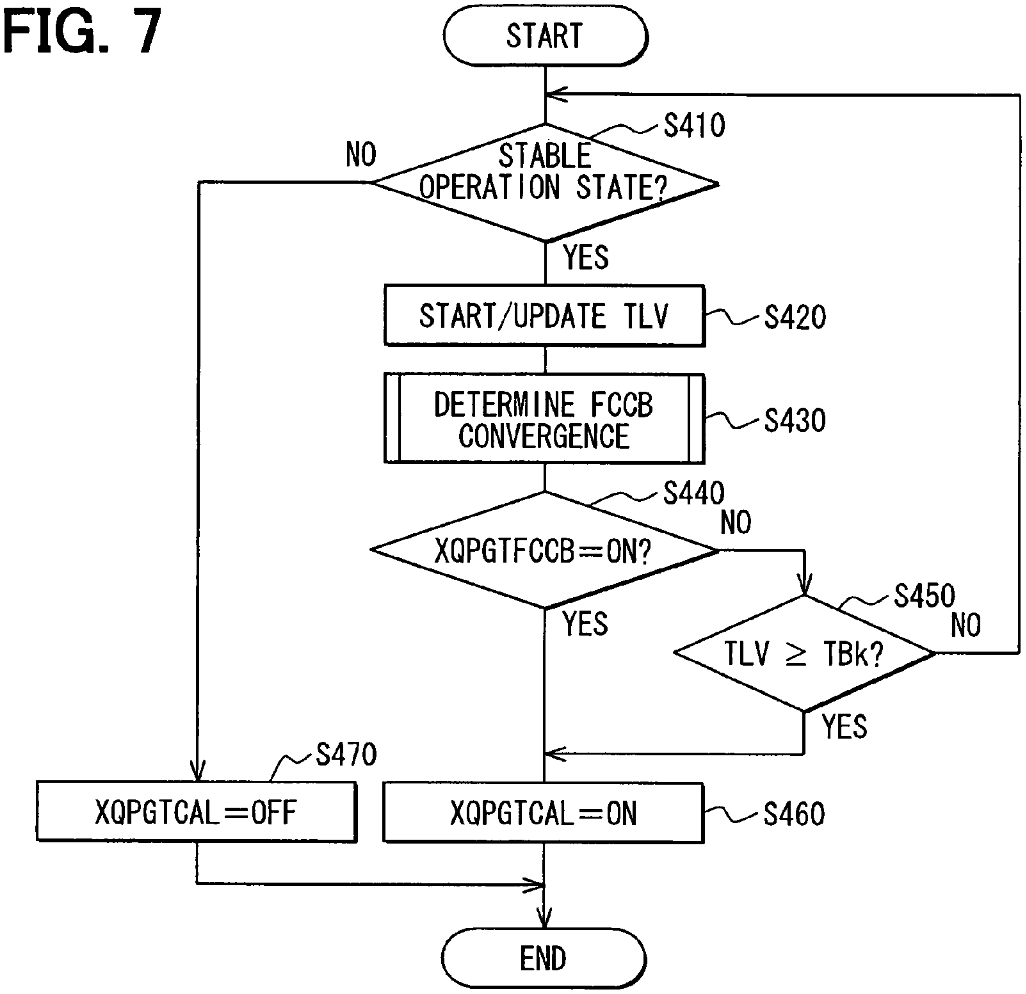
FIG. 7 is a flowchart showing a procedure of permission determination of calculation of a learning value according to the first embodiment.

FIG. 7 shows a procedure of the processing of Step S400 (i.e., learning value calculation permission determination routine). In a series of the processing, Step S410 determines whether the operation state of the diesel engine is stabilized.

In the present embodiment, it is determined whether a transitional phenomenon caused by changing the target fuel pressure has settled and the operation state is stabilized. For example, it may be determined that the operation state is stabilized if the fuel pressure P in the common rail 12 reaches a stationary state or if the rotation fluctuation of the crankshaft 8 becomes equal to or less than a predetermined value.

If it is determined that the operation state is stable, Step S420 starts and updates a learning time counter TLV. The learning time counter TLV measures the time after it is determined that the operation state is stabilized at Step S410. Following Step S430 determines whether the FCCB correction value has converged. When it is determined that the FCCB correction value has converged, a convergence flag XQPGTFCCB is turned on.

Following Step S440 determines whether the convergence flag XQPGTFCCB is ON. If it is determined that the convergence flag XQPGTFCCB is not ON, Step S450 determines whether the learning time counter TLV is "equal to or greater than" a threshold TBk. The threshold TBk is defined for each operation range (k expresses each range). The threshold TBk sets the upper limit time for terminating the learning irrespective of whether the FCCB correction value has converged. An object of this setting is to cope with the situation that the FCCB correction value does not converge over a long period of time due to a certain factor. The parameter used for the determination of the convergence in the processing of Step S430 and the threshold TBk function also as adjustment parameters for adjusting the learning accuracy and the learning frequency of the FCCB correction value. If the threshold TBk is set small, the learning accuracy tends to fall but the learning frequency is increased by bringing forward the completion of the learning.

If it is determined that the learning time counter TLV is less than the threshold TBk at Step S450, the processing returns to Step S410. If it is determined that the FCCB correction value has converged at Step S440 or if it is determined that the learning time counter TLV is equal to or greater than the threshold TBk at Step S450, the permit flag XQPGTCAL is turned on at Step S460. If it is determined that the operation state is not stable at Step S410, the permit flag XQPGTCAL is turned off at Step S470. The processing of Step S400 shown in FIG. 7 is completed if the processing of Step S460 or S470 is completed.

Figure 8:
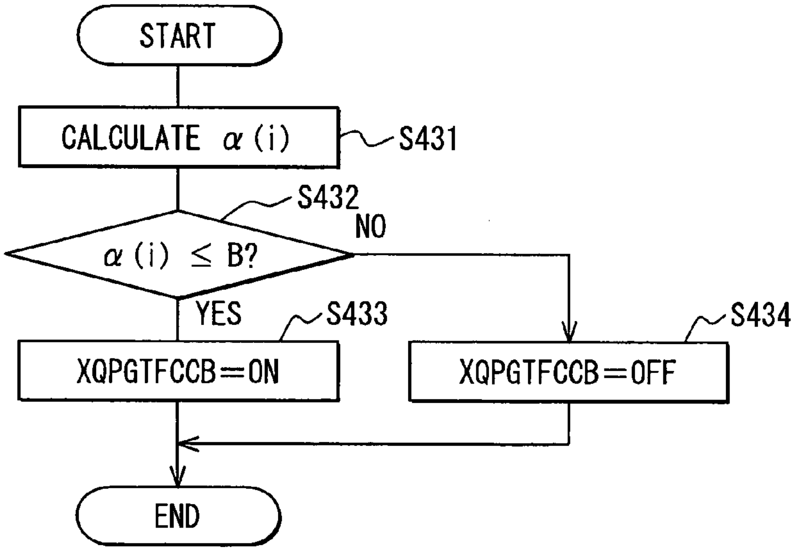
FIG. 8 is a flowchart showing a procedure of convergence determination of a FCCB correction value according to the first embodiment.
Figure 9:
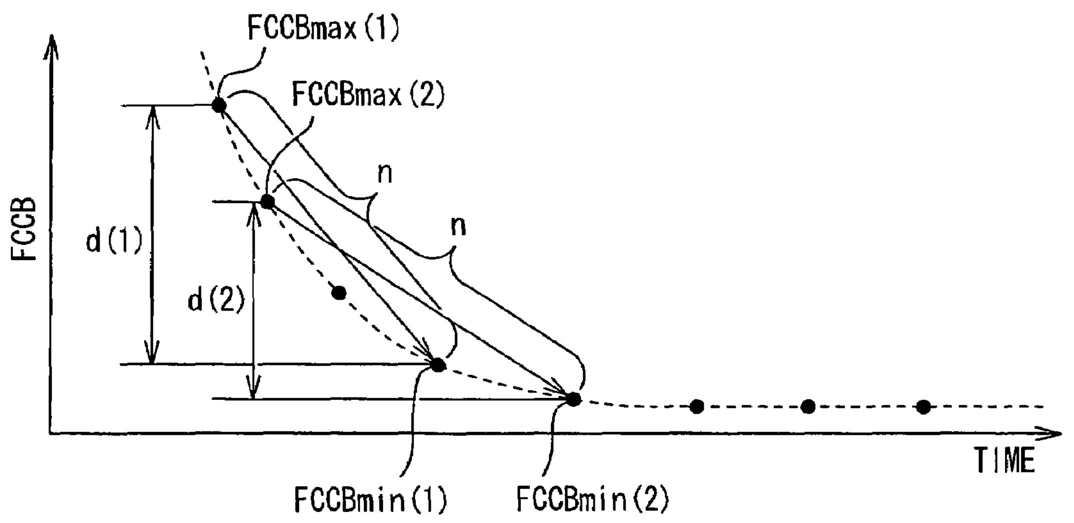
FIG. 9 is a time chart showing a calculation mode of an inclination of the FCCB correction value according to the first embodiment.

A procedure of the processing of Step S430 (FCCB convergence determination routine) is shown in FIG. 8. In a series of the processing, first, Step S431 calculates a fluctuation amount a(i) of the FCCB correction value. The fluctuation amount a(i) is calculated based on a difference d(i) between the maximum FCCBmax(i) and the minimum FCCBmin(i) of sampling values of the FCCB correction value sampled n times as shown in FIG. 9. In detail, an inclination a(i) as the fluctuation amount of the FCCB correction value is calculated by a following Expression (1) based on the difference d(i) between the maximum FCCBmax(i) and the minimum FCCBmin(i) of the sampled n pieces of the FCCB correction values FCCB(i), FCCB(i−1), . . . , FCCB (i−n+1). In Expression (1), NE represents the engine rotation speed per minute.

Expression (1):

$$d(i) = FCCB\max(i) - FCCB\min(i),$$

$$\alpha(i) = \frac{|d(i)| \times 6 \times NE}{720 \times (n-1)}$$

Thus, if the inclination a(i) as the fluctuation amount of the FCCB correction value is calculated, Step S432 of FIG. 8 determines whether the inclination a(i) of the FCCB correction value is "equal to or less than" a specified value B. If the inclination a(i) is equal to or less than the specified value B, it is determined that the FCCB correction value has converged and the convergence flag XQPGTFCCB is turned on at Step S433. If it is determined that the inclination a(i) is greater than the specified value B, it is determined that the FCCB correction value has not converged yet and the convergence flag XQPGTFCCB is turned off at Step S434.

Thus, in the present embodiment, the fluctuation amount of the FCCB correction value is quantified based on the difference between the maximum and the minimum of the n-times sampled values of the FCCB correction value. Accordingly, sensing of the minute fluctuation of the FCCB correction value is also facilitated. As a result, the existence or nonexistence of the convergence can be determined with high accuracy.

The present embodiment exerts a following effect.

(1) It is determined that the FCCB correction value has converged if the difference between the maximum and the minimum of the FCCB correction value in the predetermined period (period for n times of sampling) is equal to or less than the predetermined value $(B\times720\times(n-1)/(|d(i)|\times6\times NE))$. The learning in a certain operation range is completed by performing the learning when it is determined that the FCCB correction value has converged in the certain operation range. Thus, by completing the learning in the certain operation range when it is determined that the FCCB correction value has converged in the certain operation range, unnecessary lengthening of the learning time is avoided. Furthermore, since the fluctuation amount of the FCCB correction value is quantified in the above-mentioned mode, the minute fluctuation of the FCCB correction value can be also sensed easily. As a result, the convergence of the FCCB correction value can be determined with high accuracy.

Figure 10:
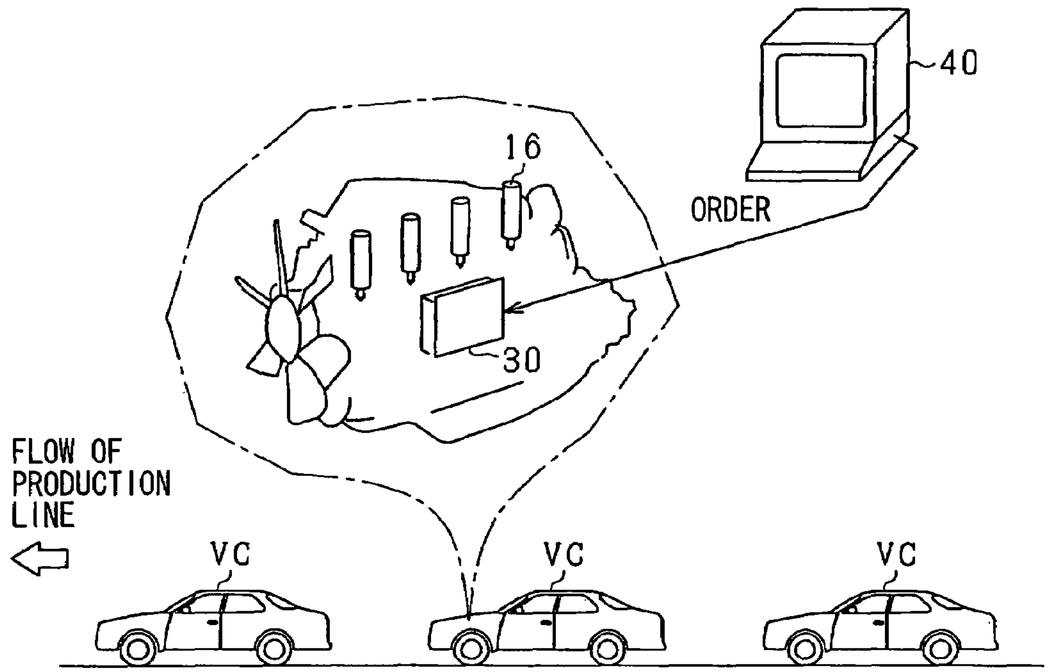
FIG. 10 is a diagram showing a mode of learning processing on a production line according to a second embodiment of the present invention.

Next, a second embodiment of the present invention will be explained in reference to FIG. 10. In the present embodiment, the deviation of the injection characteristic is learned before the shipment of the fuel injection device. FIG. 10 schematically shows a vehicle production line where the learning of the deviation of the injection characteristic according to the present embodiment is performed. As shown in FIG. 10, when vehicles VC move on the production line, a production line computer 40 (production line PC) successively orders the ECUs 30 in the vehicles VC to perform the learning of the deviations of the injection characteristics. Since the upper limit of the learning time of the deviation of the injection characteristic is decided beforehand, it is desirable to finish the learning with high accuracy within the decided time. In order to respond to such the requirement, following processing is performed in the present embodiment.

Figure 11:
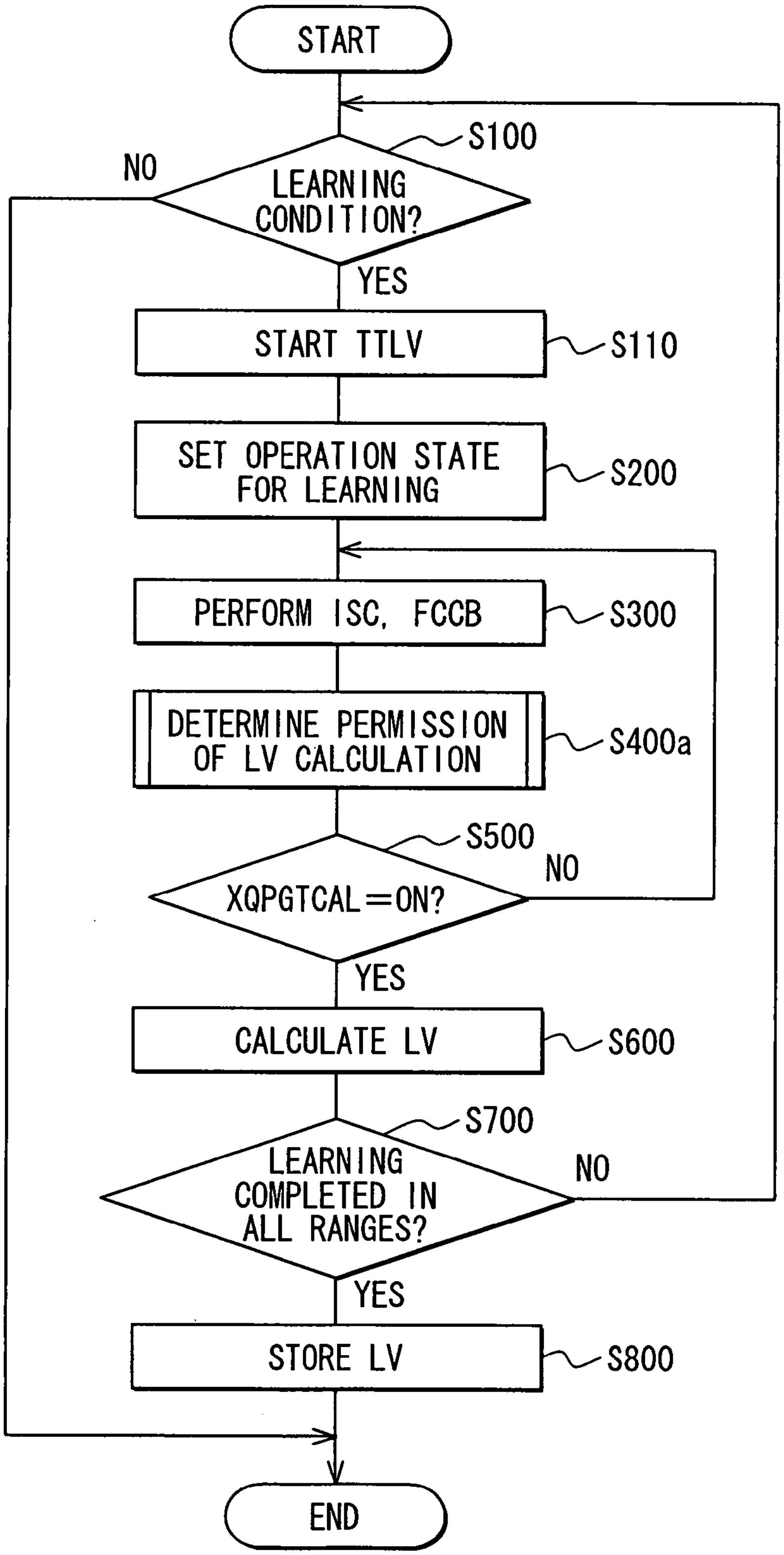
FIG. 11 is a flowchart showing a procedure of the learning according to the second embodiment.

FIG. 11 shows a procedure of the processing of the learning of the deviation of the injection characteristic (learning processing on production line) according to the present embodiment. The program in the ECU 30 repeatedly executes this processing based on the order from the production line PC 40, for example, in a predetermined cycle.

In a series of the processing, after the processing of Step S100 is performed as in the processing shown in FIG. 6, the processing goes to Step S110. Step S110 starts a total learning time counter TTLV. The total learning time counter TTLV measures the time since the learning of the FCCB correction value or the ISC correction value as the deviation of the injection characteristic is started until the learning in the entire operation ranges is completed. If the processing of Step S110 is completed, the processing of Steps S200 to S800 is performed like the processing of FIG. 6. In the present embodiment, processing of Step S400*a* is performed in place of the processing of Step S400 of FIG. 6.

Figure 12:
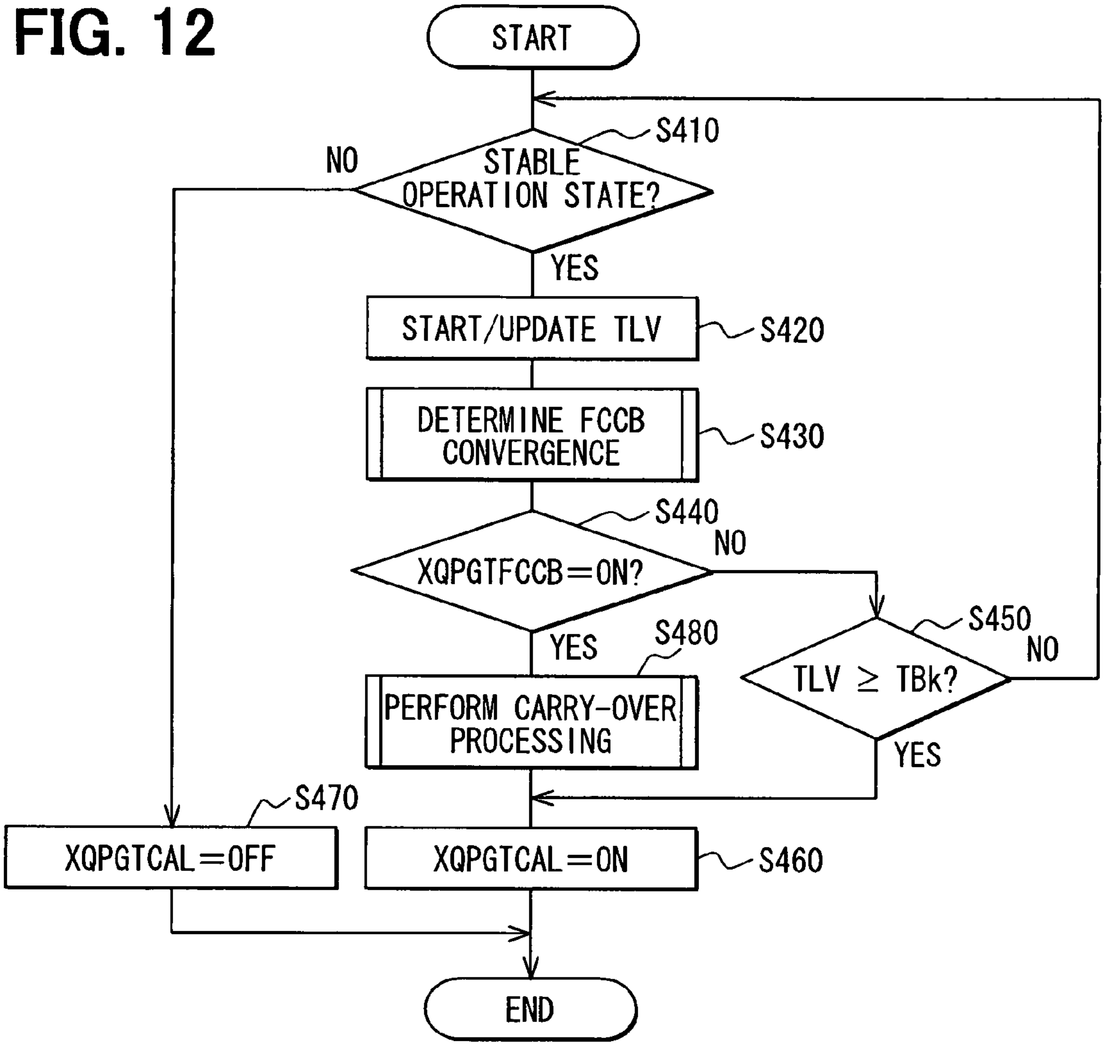
FIG. 12 is a flowchart showing a procedure of permission determination of calculation of a learning value according to the second embodiment.

FIG. 12 shows the processing of Step S400*a* (learning value calculation permission determination routine). In a series of the processing of FIG. 12, when it is determined that the FCCB correction value has converged at Step S440, processing of Step S480 is performed before transition to Step S460.

Figure 13:
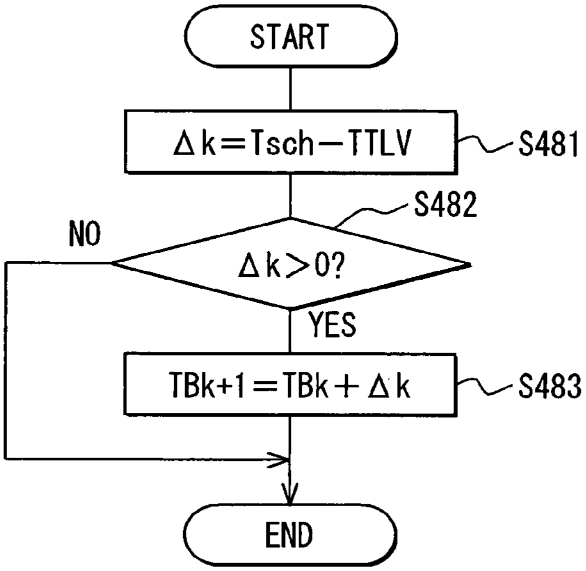
FIG. 13 is a flowchart showing a detail of carry-over processing according to the second embodiment.

FIG. 13 shows a procedure of the processing at Step S480 (carry-over processing routine). In a series of the processing shown in FIG. 13, first, Step S481 calculates a surplus time Δk as a lead time of the total learning time counter TTLV before a schedule time Tsch of the completion of the learning in the current operation range. The schedule time Tsch of the completion of the learning is beforehand defined based on the above-mentioned threshold TBk as a completion schedule time for each operation range. Following Step S482 determines whether the surplus time Δk is greater than zero. That is, it is determined whether the time when the learning is actually completed precedes the schedule time Tsch. If the surplus time Δk is determined to be greater than zero, Step S483 adds the surplus time Δk to the threshold of the next learning range. If Step S482 is NO or when the processing of Step S483 is completed, the processing of Step S480 is completed.

Figure 14:
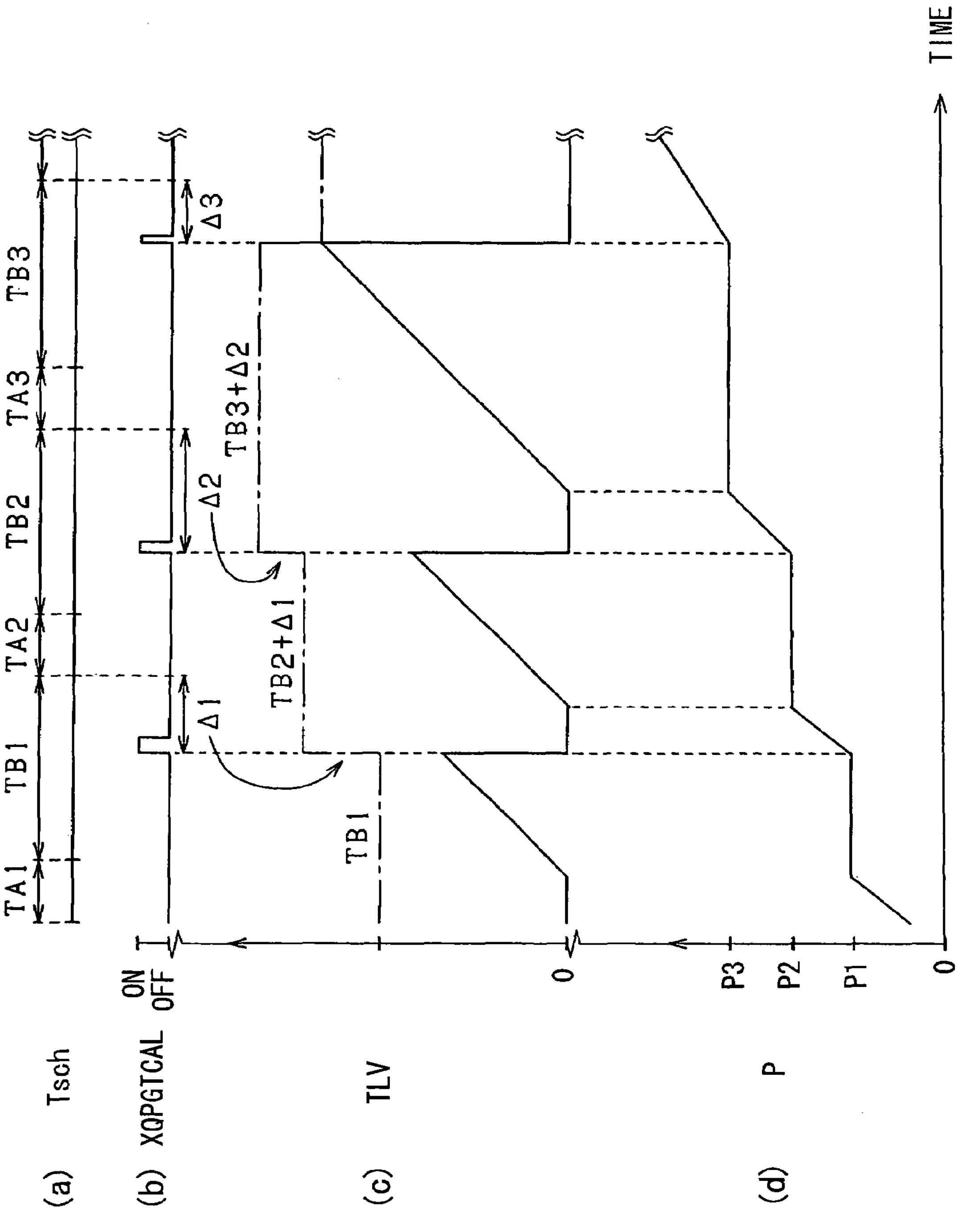
FIG. 14 is a time chart showing a mode of the learning processing according to the second embodiment.

FIG. 14 shows a mode of the learning performed through the above-described processing. As shown in FIG. 14, in the present embodiment, the learning is performed while sequentially shifting the operation range from a range where the fuel pressure in the common rail 12 is low to a range where the fuel pressure in the common rail 12 is high. The completion schedule time Tsch is defined for each operation range. That is, for the learning at the fuel pressure P1, an upper limit TA1 of a period since a transition to the fuel pressure P1 begins until the operation state is stabilized and a threshold TB1 of the learning time counter TLV are defined respectively. The total time of the upper limit TA1 and the threshold TB1 is the schedule time Tsch of the completion of the learning at the fuel pressure P1. For the learning at the fuel pressure P2 performed after the learning range of the fuel pressure P1, an upper limit TA2 of a period since a transition to the fuel pressure P2 begins until the operation state is stabilized and a threshold TB2 of the learning time counter TLV are defined respectively. Therefore, the schedule time Tsch of the completion of the learning of this range is the sum of the upper limits TA1, TA2 and the thresholds TB1, TB2.

FIG. 14 shows an example in which the period necessary for the stabilization of the operation state in the operation range of the fuel pressure P1 or the period necessary for the convergence of the FCCB correction value is short and therefore the completion of the learning precedes the schedule time Tsch. In this case, correction of increasing the following threshold TB2 with the surplus time Δ1 as the lead time is performed. Thus, the time permitted for the learning in the operation range of the fuel pressure P2 can be increased, while leaving the learning schedule time Tsch intact.

Thus, according to the present embodiment, the lead time of the completion of the learning before the schedule time is added to the threshold in the next learning range, so the learning time in the next learning range can be sufficiently secured. Since the learning is performed sequentially from the low fuel pressure range to the high fuel pressure range in the present embodiment, utilization of the lead time is facilitated. That is, as shown in FIG. 3, the convergence time of the FCCB correction value tends to lengthen as the fuel pressure increases. Therefore, by performing the learning sequentially from the low fuel pressure range, the completion of the learning tends to precede the schedule time in the early stages of the learning. Therefore, the surplus time can be carried over to the high-pressure operation range, in which the learning tends to require a long period of time. As a result, the learning time in the high-pressure operation range can be sufficiently secured.

The present embodiment exerts following effects in addition to the effect (1) of the first embodiment.

(2) When the time of the completion of the learning precedes the schedule time decided by the threshold TBk (k=1, 2, 3, . . . ) of the period necessary for the convergence of the FCCB correction value of the current operation range, the lead time of the completion of the learning before the schedule time is added to the threshold TBk of the next learning range. Thus, the highly accurate learning can be performed while avoiding the unnecessary lengthening of the learning time.

(3) The schedule time is defined by the sum of the upper limit (TA1, TA2, TA3, . . . ) of the transition period since the transition of the operation range begins until the operation state of the diesel engine is stabilized and the threshold of the period necessary for the completion. Thus, the schedule time can be defined appropriately.

(4) After the transition of the operation range, the learning is compulsorily terminated irrespective of whether the FCCB correction value has converged when the period after it is determined that the operation state is stabilized reaches the threshold TBk. Thus, excessive lengthening of the learning time can be avoided.

(5) The operation range is divided in accordance with the fuel pressure of the fuel supplied to the injector 16. Thus, the learning can be performed with high accuracy irrespective of the change of the injection characteristic due to the fuel pressure.

(6) The learning is performed sequentially from the operation range of the low fuel pressure. Thus, the threshold TBk can be increased in the operation range of the high fuel pressure, where the time necessary for the convergence of the FCCB correction value tends to lengthen, without lengthening the total learning time.

(7) By performing the multiple fuel injections of approximately the same quantities of the fuel in one combustion cycle, the learning based on the rotation fluctuation can be performed appropriately while setting the fuel injection quantity of each injection at a minute quantity.

(8) The ECU 30 has the function to perform the processing shown in FIG. 11. Therefore, the learning can be performed only by outputting the order of the learning of the deviation of the injection characteristic from the production line PC 40 on the production line.

The above-described embodiments may be modified as follows, for example.

Figure 15:
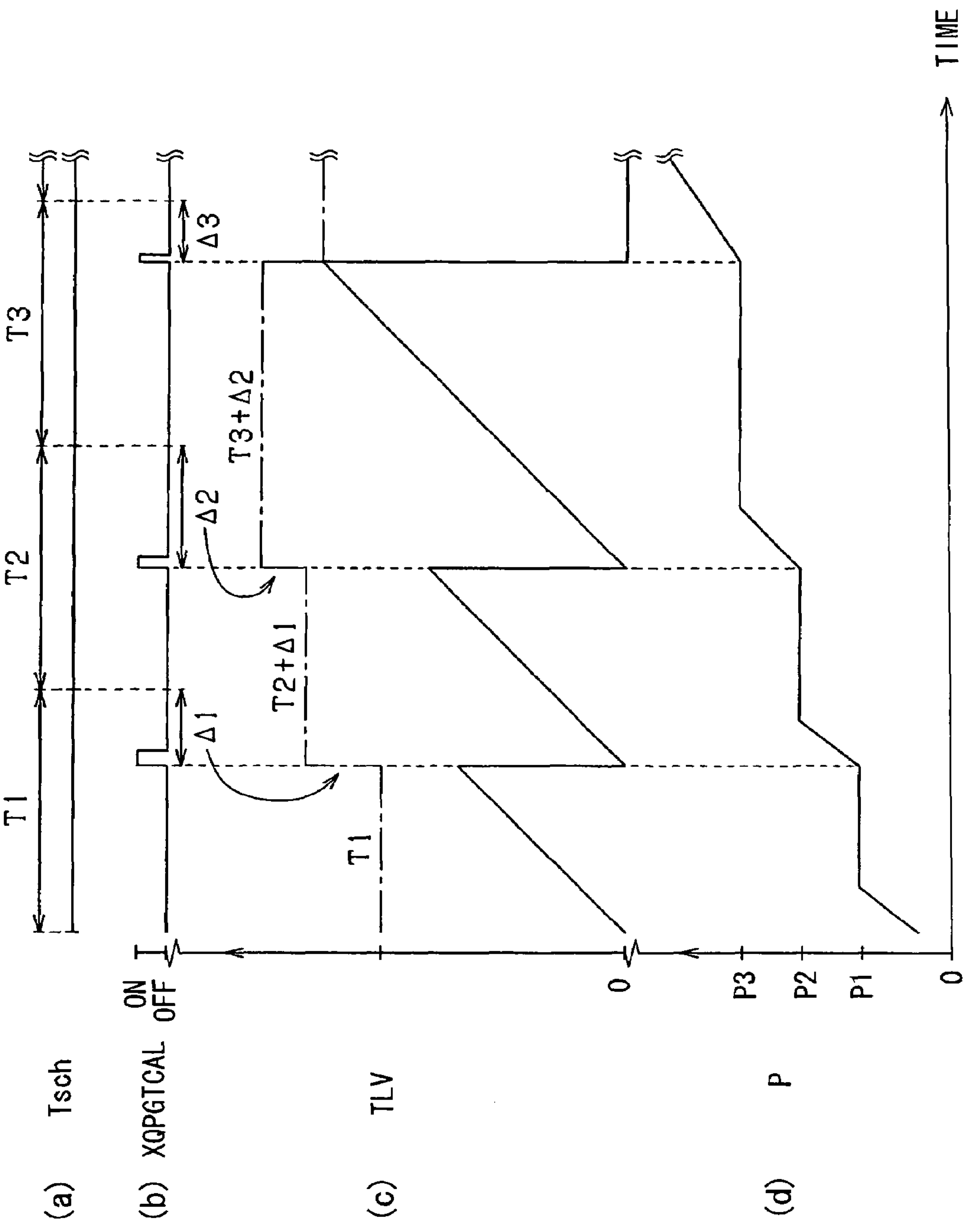
FIG. 15 is a time chart showing a mode of learning processing of a modification of the second embodiment.

In FIG. 12, the count of the learning time counter is started after the operation state is stabilized. Alternatively, the count of the learning time may be started immediately after the transition of the operation range. In this case, the schedule time Tsch is decided only by a threshold Tk (k=1, 2, 3, . . . ) as shown in FIG. 15. Further, at Step S481 of FIG. 13, the surplus time may be calculated by subtracting the learning counter TLV from the threshold TBk.

Figure 16:
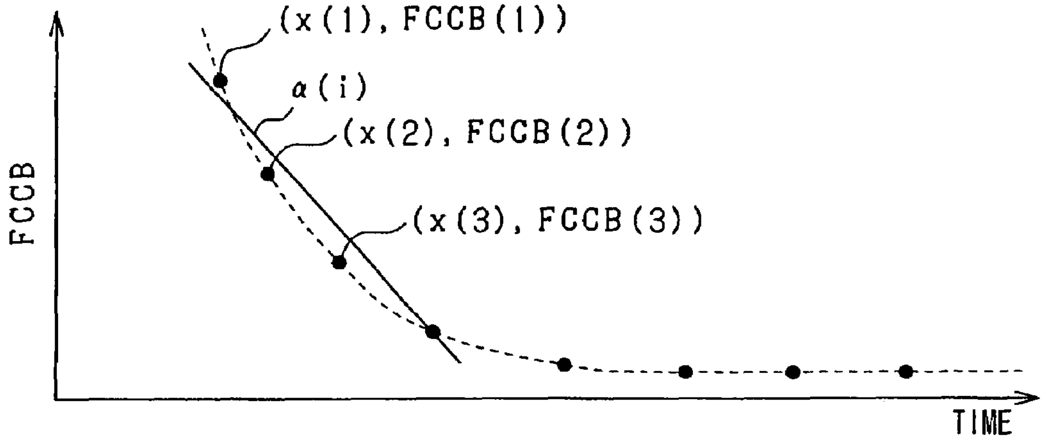
FIG. 16 is a time chart showing a calculation mode of an inclination of a FCCB correction value of a modification of the first or second embodiment.

The method of determining the convergence of the FCCB correction value is not limited to the method illustrated in FIG. 9. For example, as shown in FIG. 16, the inclination a(i) may be calculated through the least square method using n pieces of sampling values of the FCCB correction value based on following Expression (2).

Expression (2):

$$x(i) = \frac{720 \times i}{6 \times NE},$$

$$\alpha(i) = \frac{n\sum_{j=1}^{n+i-1} x(j)FCCB(j) - \sum_{j=1}^{n+i-1} x(j) \sum_{j=1}^{n+i-1} FCCB(j)}{n\sum_{j=1}^{n+i-1} x(j)^2 - \left(\sum_{j=1}^{n+i-1} x(j)\right)^2}$$

Thus, the inclination a(i) of the line that matches the inclination of the n pieces of the sampling values most can be calculated. As a result, the convergence determination can be performed appropriately.

Figure 17A:
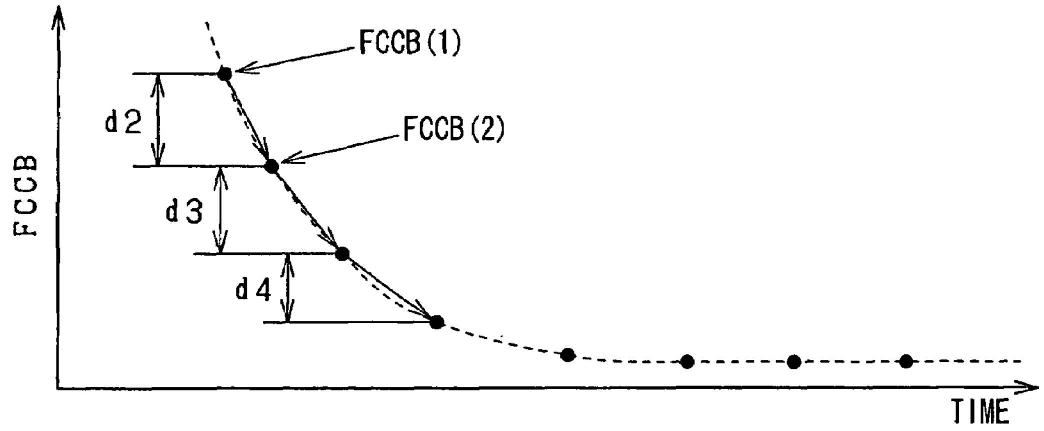
FIG. 17A is a time chart showing a calculation mode of an inclination of a FCCB correction value of another modification of the first or second embodiment.

As shown in FIG. 17A, the inclination a(i) may be defined simply by a difference between two adjoining sampling values based on following Expression (3).

Expression (3):

$$d(i) = FCCB(i) - FCCB(i-1),$$

$$\alpha(i) = \frac{|d(i)| \times 6 \times NE}{720}$$

Figure 17B:
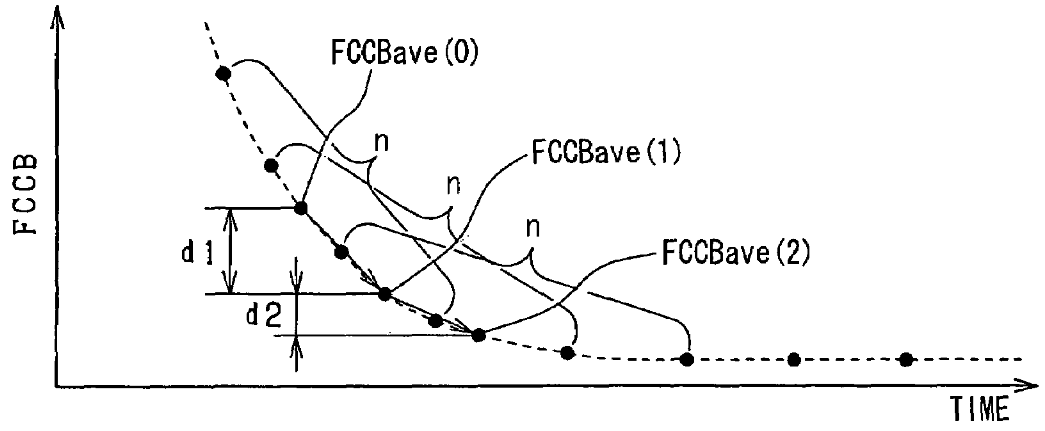
FIG. 17B is a time chart showing a calculation mode of an inclination of a FCCB correction value of yet another modification of the first or second embodiment.

Further, as shown in FIG. 17B, the inclination a(i) may be calculated from a difference d(i) between an average FCCBave(i) of n pieces of sampling values from the value FCCB(i) to the value FCCB(i+n−1) and an average FCCBave (i−1) of n pieces of sampling values from the value FCCB(i−1) to the value FCCB(i+n−2) based on following Expression (4).

Expression (4):

$$d(i) = FCCBave(i) - FCCBave(i-1),$$

$$\alpha(i) = \frac{|d(i)| \times 6 \times NE}{720}$$

In the second embodiment, the ECU 30 has the function to perform the processing shown in FIG. 11 even after the product shipment. The processing of FIG. 11 is started by the order from the production line PC 40. Alternatively, an ECU dedicated to the production line may be attached only at the time of learning. The production line PC 40 may perform the learning while operating the various actuators of the diesel engine.

The multi-injection is not limited to the multi-injection performing the pilot injection. The learning of the deviation of the fuel injection characteristic at the time of the minute quantity injection based on the equally divided injections is effective as long as the multi-injection performs the minute quantity injection even if the multi-injection does not perform the pilot injection.

The internal combustion engine is not limited to the diesel engine but may be a gasoline engine. Performing the learning under the condition of the convergence of the fluctuation correction value for suppressing the rotation fluctuation among the cylinders is effective when performing the learning for compensating the variation in the injection characteristics among the cylinders, even if the structure does not perform the minute quantity injection.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A learning method comprising:

a calculation step of calculating a fluctuation correction value for inhibiting rotation fluctuation of an output shaft of a multi-cylinder internal combustion engine among cylinders of the engine when fuel injection is performed in the engine with injectors;

a fluctuation inhibition step of reflecting the fluctuation correction value in operation of the injector; and a learning step of learning a deviation of an injection characteristic of the injector for each operation range of the engine in accordance with the fluctuation correction value while preventing a learning time of the deviation of the injection characteristic of the injector from exceeding a threshold, wherein the learning step includes:

a convergence determination step of determining whether the fluctuation correction value has converged;

a completion step of completing the learning in a certain operation range by performing the learning when the convergence determination step determines that the fluctuation correction value has converged in the certain operation range; and a carry-over step of adding a lead time of the completion of the learning before a schedule time, which is decided by the threshold, to a threshold of an operation range, in which the learning is not yet performed, if the completion of the learning precedes the schedule time.

2. The learning method as in claim 1, further comprising:

a transition step of causing the operation range of the engine to make sequential transition from one operation range to another in order to perform the learning, wherein the schedule time is decided by summation of an upper limit of a transition period since the transition is started by the transition step until an operation state of the engine is stabilized and the threshold of the period necessary for the completion of the learning.

3. The learning method as in claim 2, further comprising:

a stabilization determination step of determining whether the operation state of the engine is stabilized after the transition is started by the transition step, wherein the learning step compulsorily terminates the learning irrespective of whether the convergence determination step provides the determination of the convergence if a period after the stabilization determination step determines that the operation state is stabilized reaches the threshold.

4. The learning method as in claim 1, wherein the operation ranges are defined by pressure of fuel supplied to the injector.

5. The learning method as in claim 4, wherein the learning step performs the learning sequentially from an operation range where the pressure of the fuel is low.

6. The learning method as in claim 1, wherein the convergence determination step determines that the fluctuation correction value has converged if a difference between a maximum and a minimum of the fluctuation correction value in a predetermined period becomes equal to or less than a predetermined value.

7. The learning method as in claim 1, wherein the fuel injection performs a plurality of times of fuel injections of approximately equal quantities of fuel during a combustion cycle, and the learning step learns the deviation of the injection characteristic of the injector regarding the fuel injection corresponding to the injection quantity of each one of the fuel injections performed during the combustion cycle.

8. A fuel injection controller comprising:

a fluctuation inhibition device that calculates a fluctuation correction value for inhibiting rotation fluctuation of an output shaft of a multi-cylinder internal combustion engine among cylinders of the engine when fuel injection is performed in the engine with injectors and that reflects the fluctuation correction value in operation of the injector; and a learning device that learns a deviation of an injection characteristic of the injector for each operation range of the engine in accordance with the fluctuation correction value while preventing a learning time of the deviation of the injection characteristic of the injector from exceeding a threshold, wherein the learning device includes:

a convergence determination device that determines whether the fluctuation correction value has converged;

a completion device that completes the learning in a certain operation range by performing the learning when the convergence determination device determines that the fluctuation correction value has converged in the certain operation range; and a carry-over device that adds a lead time of the completion of the learning before a schedule time, which is decided by the threshold, to a threshold of an operation range, in which the learning is not yet performed, if the completion of the learning precedes the schedule time.

9. The fuel injection controller as in claim 8, further comprising:

a transition device that causes the operation range of the engine to make sequential transition from one operation range to another in order to perform the learning, wherein the carry-over device decides the schedule time based on summation of an upper limit of a transition period since the transition is started by the transition device until an operation state of the engine is stabilized and the threshold of the period necessary for the completion of the learning.

10. The fuel injection controller as in claim 9, further comprising:

a stabilization determination device that determines whether the operation state of the engine is stabilized after the transition is started by the transition device, wherein the learning device compulsorily terminates the learning with the completion device irrespective of whether the convergence determination device provides the determination of the convergence if a period after the stabilization determination device determines that the operation state is stabilized reaches the threshold.

11. The fuel injection controller as in claim 8, wherein the operation ranges are defined by pressure of fuel supplied to the injector.

12. The fuel injection controller as in claim 11, wherein the learning device performs the learning sequentially from an operation range where the pressure of the fuel is low.

13. The fuel injection controller as in claim 8, wherein the convergence determination device determines that the fluctuation correction value has converged if a difference between a maximum and a minimum of the fluctuation correction value in a predetermined period becomes equal to or less than a predetermined value.

14. The fuel injection controller as in claim 8, wherein the fuel injection performs a plurality of times of fuel injections of approximately equal quantities of fuel during a combustion cycle, and the learning device learns the deviation of the injection characteristic of the injector regarding the fuel injection corresponding to the injection quantity of each one of the fuel injections performed during the combustion cycle.

15. A fuel injection controller comprising:

a fluctuation inhibition device that calculates a fluctuation correction value for inhibiting rotation fluctuation of an output shaft of a multi-cylinder internal combustion engine among cylinders of the engine when fuel injection is performed in the engine with injectors and that reflects the fluctuation correction value in operation of the injector; and a learning device that learns a deviation of an injection characteristic of the injector for each operation range of the engine in accordance with the fluctuation correction value, wherein the learning device includes a convergence determination device that determines that the fluctuation correction value has converged if a difference between a maximum and a minimum of the fluctuation correction value in a predetermined period becomes equal to or less than a predetermined value, and the learning device completes the learning in a certain operation range by performing the learning when the convergence determination device determines that the fluctuation correction value has converged in the certain operation range.

16. A fuel injection controller comprising:

a fluctuation inhibition device that calculates a fluctuation correction value for inhibiting rotation fluctuation of an output shaft of a multi-cylinder internal combustion engine among cylinders of the engine when fuel injection is performed in the engine with injectors and that reflects the fluctuation correction value in operation of the injector; and a learning device that learns a deviation of an injection characteristic of the injector for each operation range of the engine in accordance with the fluctuation correction value, wherein the learning device includes a convergence determination device that determines that the fluctuation correction value has converged if an inclination of the fluctuation correction value calculated by the least square method in a predetermined period becomes equal to or less than a certain value, and the learning device completes the learning in a certain operation range by performing the learning when the convergence determination device determines that the fluctuation correction value has converged in the certain operation range.

* * * * *